March 14, 1944.  E. N. FORSTER  2,344,349

WHEEL BALANCING MACHINE

Filed Nov. 6, 1942   2 Sheets-Sheet 1

Inventor
Earl N. Forster,
By Frank L. Appleman
Attorney

March 14, 1944.  E. N. FORSTER  2,344,349
WHEEL BALANCING MACHINE
Filed Nov. 6, 1942  2 Sheets-Sheet 2
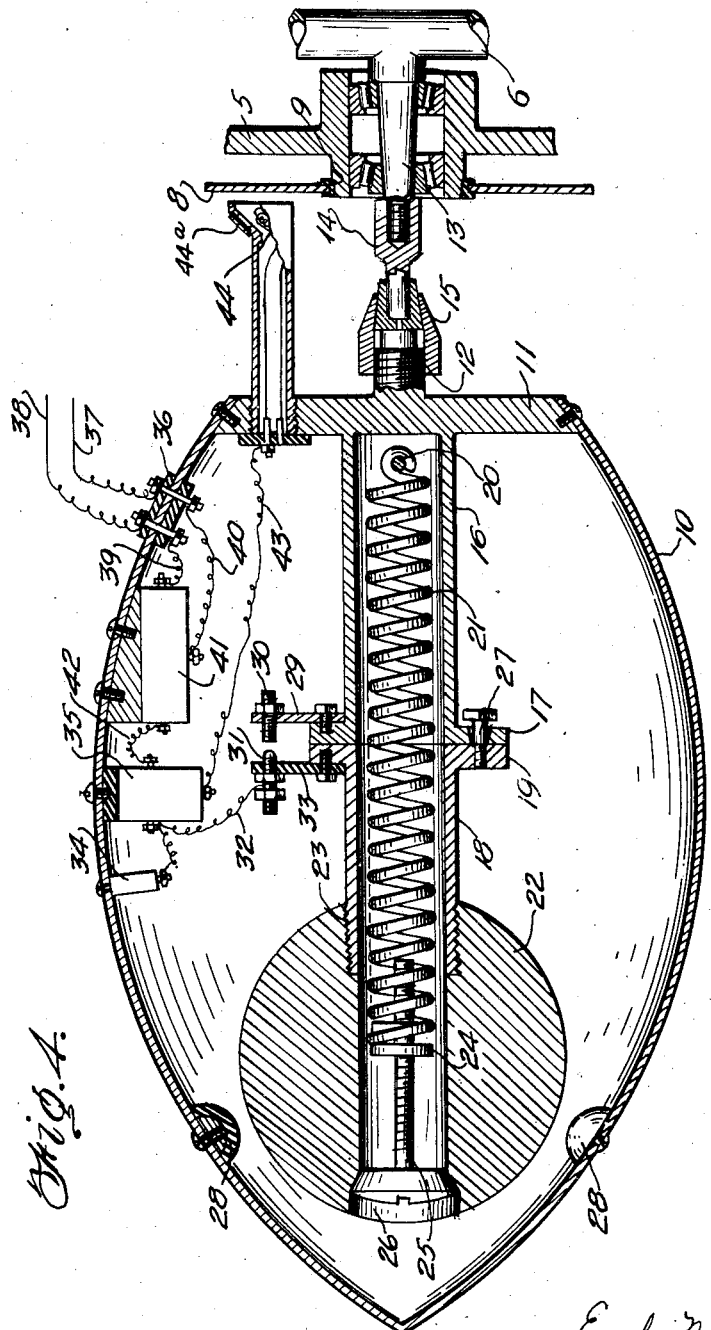
Inventor,
Earl N. Forster,
By Frank L. Ackleman,
Attorney.

Patented Mar. 14, 1944

2,344,349

UNITED STATES PATENT OFFICE 2,344,349

WHEEL BALANCING MACHINE

Earl N. Forster, Arcata, Calif.

Application November 6, 1942, Serial No. 464,797

3 Claims. (Cl. 73—53)

This invention relates to a machine or apparatus for testing the balance of wheels such as those of automobiles, and an object of the invention is to provide such a machine capable of being connected to the axles of automobiles on which the wheels are mounted and which, when the wheel is rotated, will indicate the critical speed at which the defect as to the balance of the wheel is most pronounced, and will also indicate the position on the wheel where counterbalancing weight should be applied for correcting the abnormal condition of the wheel.

More specifically, the improvement relates to an automotive dynamic wheel balancer for balancing wheels and tires so that they may be rotated at high speed without wobbling, vibrating, or creating a "shimmy" of the wheels. By correcting the balance thus detected, excessive wear on the suspension parts, spindle bolts, bushings and wheel bearings will be eliminated.

It is a further object of this invention to provide a detector of the character stated which can be employed without removing the wheels from the automobile, with the result that correct dynamic balance of the spindle shaft itself will occur and of course there will be other advantages which those skilled in the art can visualize.

It is furthermore an object of the invention to provide a disk with indicia thereon which is rotatable with the wheel of the automobile, and to provide means for illuminating the indicia at the location where the wheel is out of balance and wobbles to a degree that a circuit is established for illuminating the indicia, it being an object of the invention to provide novel means for establishing an electric circuit for illuminating purposes when the eccentric motion of mechanism associated with the axle or other rotating part of an automobile is sufficient for establishing the aforesaid circuit.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 4 illustrates an enlarged detail sectional view approximately centrally of Fig. 1.

In these drawings 5 denotes an automobile wheel, 6 the mounting therefor and, in the present illustration, means are shown for rotating the wheel, as through the use of a motor 7.

Figure 1:
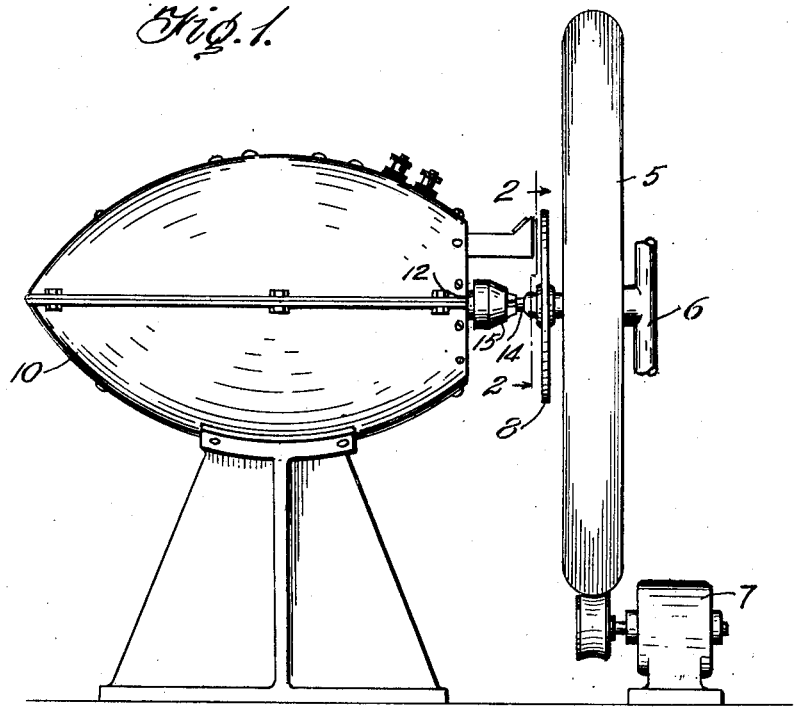
Figure 1 illustrates a view in elevation of the testing machine applied to the wheel and axle of an automobile.
Figure 2:
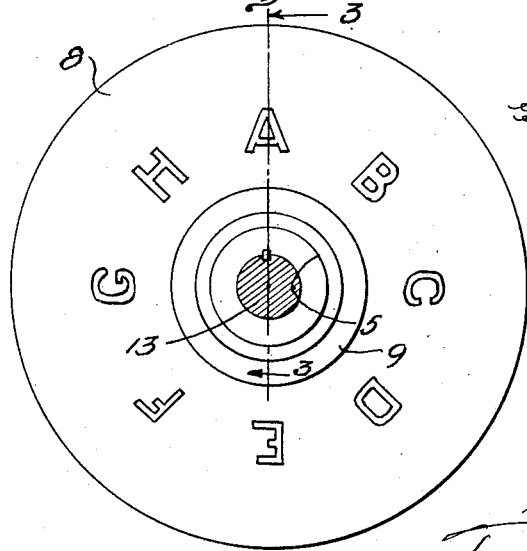
Figure 2 illustrates a sectional view on the line 2—2 of Fig. 1.
Figure 3:
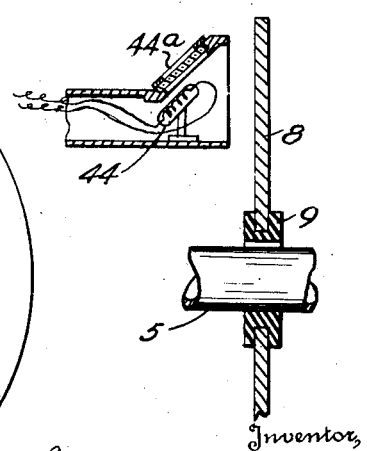
Figure 3 illustrates a sectional view of the lamp and disk rearwardly of the disk, on the line 3—3 of Fig. 2.

A disk 8 having indicia on its face is associated with a coupling 9 by which it is attached to the wheel of the automobile, and the inventor does not wish to be limited with respect to the means for causing the disk to rotate with the wheel. However, in the present embodiment, the coupling 9 is preferably of flexible material, such as rubber, which can be applied to the hub of the automobile or parts to which it is attached and there held by friction. As illustrated in Fig. 2, the indicia on the disk comprises the letters from A to H, but other indicia or graduations may be employed.

The instrument includes a housing 10 in which the operating parts are installed and the housing has a head or end plate 11 with a threaded lug 12 on its outer face, and the said lug is connected to a spindle 13 of the wheel through the employment of a nut adaptor 14 screwed onto the spindle in place of the spindle nut. The member 14 is rigid with the spindle and is connected to the lug 12 by the chuck 15 so that through this coupling the housing is vibrated, for a purpose to be presently explained. The head 11 has a tube 16 extending inwardly a suitable distance and it has an outwardly extending annular flange 17 at its inner end. There is a tubular extension 18 having an outwardly extending annular flange 19 abutting the flange 17. An anchoring member, such as a pin 20, is secured to the tube 16 and projects therethrough. A spring 21 has one end secured to the pin 20 and it projects through the said tube and the extension 18. The end of the tubular extension remote from the flange 19 has a ball or weight 22 anchored to it preferably by a screw-threaded joint 23, and the inner end of the spring 21 abuts a nut 24 adjustable on a screw 25, which screw has its head located in a seat 26 in the ball, it being shown that the said ball is hollow as a clearance for the screw 25. By reason of the assembly just disclosed, the tension of the spring may be increased or diminished by the adjustment of the nut on the screw. The flanges 17 and 19 have dowels 27 which permits free rocking motion of the flange 19 on the flange 17, but the said dowels maintain the parts in alinement, under normal conditions. The dowel pins are threaded in one of the flanges such as 19 and the dowel moves freely on the flange 17 when it is moved under the influence of the ball or weight.

The housing 10 has buffers 28 on its inner surface located in spaced relation, one to the other, so that the ball is limited in its movement when it strikes the buffers, and the buffers also absorb vibration, due to the action of the ball.

The flanges 17 and 19 which are movable with relation to each other under the influence of the ball or weight have electric switch members connected to them so that a circuit is established or broken, due to the movement of one switch member with relation to the other and, in the present embodiment, a switch member 29 is secured to the flange 17 to form a ground for the circuit, and the said member 29 has a contacting screw 30 or the like, adjustable for increasing or diminishing the space between it and a terminal 31 of the conductor 32, it being shown that the terminal 31 is carried by an insulating member 33 anchored to the flange 19. Hence, as the flange 19 moves with relation to the flange 17, the circuit may be established through the contacts or terminals 30 and 31.

The conductor 32 is connected to a condenser 34 and to a high tension coil 35. The condenser and coil are anchored to the inner wall of the housing. A suitable electric terminal 36 has binding posts for the conductors 37 and 38 leading from any suitable source of current supply, the strength of which should be 110 volts. Conductors 39 and 40 lead from the terminals to a transformer 41 capable of changing the 110 volt alternating current to a 6–8 volt direct current and the transformer is grounded to balance unit. A conductor or lead 42 connects the transformer 41 with the high tension coil 35, and the high tension coil 35 has a conductor 43 leading to a lamp 44 which is preferably a high tension neon lamp, the light from which lamp is reflected by a mirror 44ª or the like on the indicia of the disk 8, the lamp being suitably grounded in the head 11 of the housing.

As the connections have been described in connection with their use in association with the several parts of the electric system, it is believed unnecessary for an understanding of the invention by one skilled in the art to furnish a résumé of the operation, except to say that when a wheel is out of balance and causes a vibration of the housing through the connection of the housing with the spindle of the automobile, motion will be imparted to the weight or ball and it will oscillate the tubular extension 18, the flange 19 of which will rock on the flange 17 and establish a circuit to the lamp 44 to illuminate the indicia on the disk and, in this connection, the inventor prefers that the indicia should be luminous in character in order that the indicia can be read to better advantage.

I claim:

1. In a wheel balancing machine, a disk having indicia on its face mounted to rotate with the hub of a wheel to be balanced, an extension shaft on a member on which the wheel is mounted to rotate, a housing having a coupling into which the shaft extends, a high tension electric lamp mounted at the end of the housing in position to reflect light on the face of the disk, a sectional tube extending inwardly from the end of the housing having the said coupling, one section of the tube being stationary with the housing and the other section being movable with relation to the stationary section, a spring in the tube, one end of which is anchored to the stationary section of the tube, the said spring extending past the joint between the sections, a weight on the end of the movable section, said weight having a hole extending through the weight and communicating with the interior of the sectional tube, a screw rotatable in the said hole, a member threaded on the screw to which the spring is connected whereby rotation of the screw determines the tension of the spring, an electric switch member carried by one of the tubular sections, an electric switch member operating in conjunction with the first mentioned switch member mounted on the other section of the tube, whereby movement of one section of the tube establishes or breaks a circuit, a source of electricity, and means for supplying current from the said source through the said switch to the said lamp, whereby the indicia on the disk is illuminated at the location of the defective balance of the wheel.

2. In a wheel balancing machine, a disk having indicia on its face mounted to rotate with the hub of a wheel to be balanced, an extension shaft on a member on which the wheel is mounted to rotate, a housing having a coupling into which the shaft extends, a high tension electric lamp mounted at the end of the housing in position to reflect light on the face of the disk, a sectional tube extending inwardly from the end of the housing having the said coupling, one section of the tube being stationary with the housing and the other section being movable with relation to the stationary section, a spring in the tube, one end of which is anchored to the stationary section of the tube, the said spring extending past the joint between the sections, a weight on the end of the movable section, said weight having a hole extending through the weight and communicating with the interior of the sectional tube, a screw rotatable in the said hole, a member threaded on the screw to which the spring is connected whereby rotation of the screw determines the tension of the spring, an electric switch member carried by one of the tubular sections, an electric switch member operating in conjunction with the first mentioned switch member mounted on the other section of the tube, whereby movement of one section of the tube establishes or breaks a circuit, a source of electricity, a circuit from the said source of electricity through said switch to said lamp, including a transformer and a high tension coil controlled by the said switch, whereby the indicia on the disk is illuminated at the location of the defective balance of the wheel.

3. In a wheel balancing machine, a disk having indicia on its face, said disk having a yieldable central ring for frictionally engaging a hub of an automobile wheel, an extension shaft on a member on which the wheel is mounted to rotate, a housing having a coupling into which the shaft extends, a neon lamp mounted at the end of the housing in position to reflect light on the face of the disk, a sectional tube extending inwardly from the end of the housing having the said coupling, one section of the tube being stationary with the housing and the other section being movable with relation to the stationary section, a spring in the tube, one end of which is anchored to the stationary section of the tube, the said spring extending past the joint between the sections, a weight on the end of the movable section, said weight having a hole extending through the weight and communicating with the interior of the sectional tube, a screw rotatable in the said hole, a member threaded on the screw to which the spring is connected whereby rotation of the screw determines the tension of the spring, an electric switch member carried by one of the tubular sections, an electric switch member operating in conjunction with the first mentioned switch member mounted on the other section of the tube, whereby movement of one section of the tube establishes or breaks a circuit, a source of electricity, and means for supplying current from the said source through the said switch to the said lamp, whereby the indicia on the disk is illuminated at the location of the defective balance of the wheel.

KARL N. FORSTER.